Aug. 22, 1933. O. EISENHUT ET AL 1,923,140
PRODUCTION OF ACETYLENE AND CARBON BLACK
Filed Sept. 19, 1931
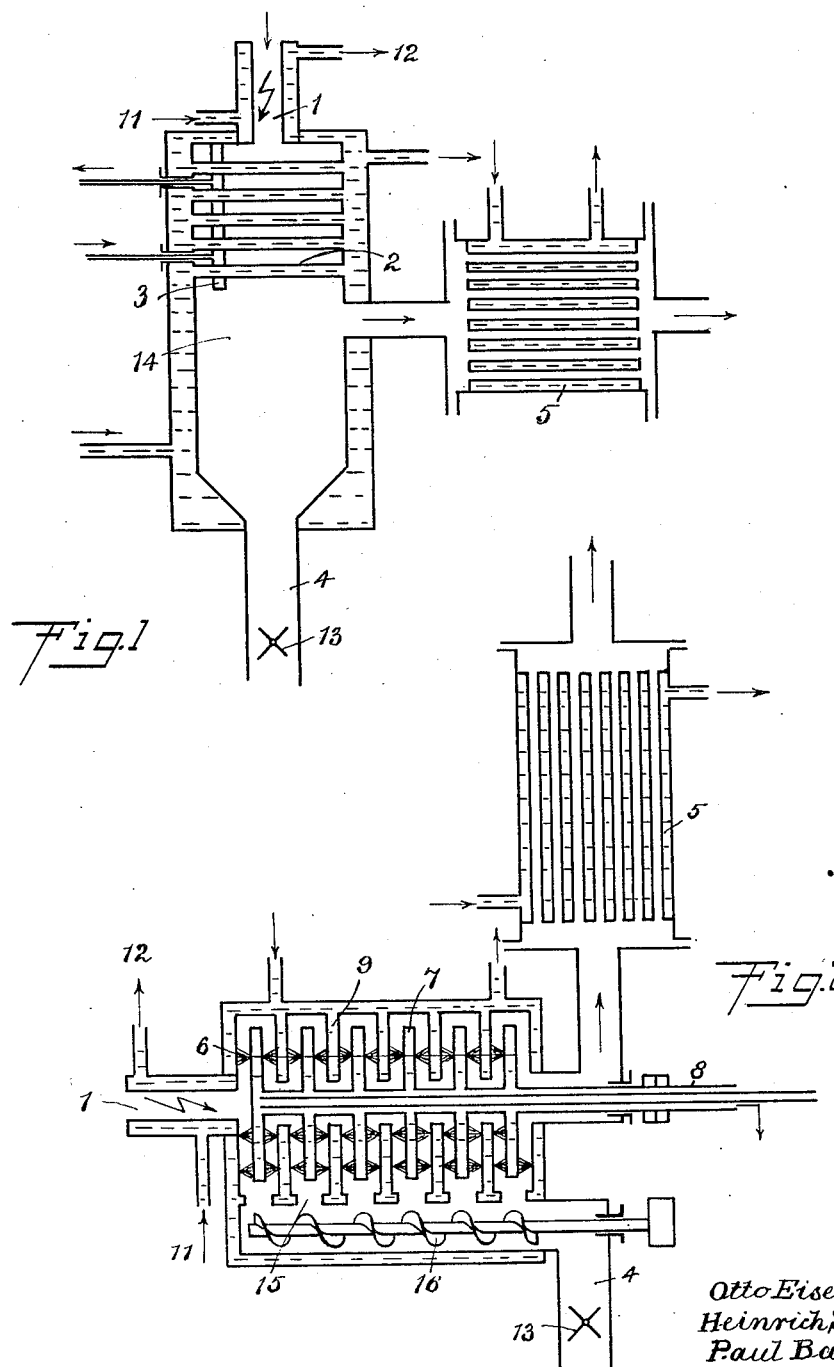
Otto Eisenhut
Heinrich Schilling
Paul Baumann,
INVENTORS
BY
ATTORNEYS

Patented Aug. 22, 1933

1,923,140

UNITED STATES PATENT OFFICE

1,923,140

PRODUCTION OF ACETYLENE AND CARBON BLACK

Otto Eisenhut, Heidelberg, and Heinrich Schilling and Paul Baumann, Ludwigshafen-on-the-Rhine, Germany, assignors to I. G. Farbenindustrie Aktiengesellschaft, Frankfort-on-the-Main, Germany Application September 19, 1931, Serial No. 563,785, and in Germany September 22, 1930

3 Claims. (Cl. 204—31)

The present invention relates to improvements in the production of acetylene and carbon black.

It is already known that in the thermal production of acetylene from gaseous or vaporous hydrocarbons (hereinafter referred to as vaporized hydrocarbons), such as methane or gases containing the same, e.g. natural gases in the electric arc, at any desired pressure, more or less large amounts of carbon black are usually formed. This carbon black, especially in large amounts, may have an injurious effect on the continuous production of acetylene if it is deposited on the cooling elements serving to cool the acetylene. On the other hand the reaction gases must be cooled as rapidly as possible in order to prevent subsequent decomposition or polymerization of the acetylene, processes which, especially in the presence of solid substances having a catalytic action, as for example the walls of the vessel or the carbon black itself, readily proceed spontaneously.

We have now found that the desired objects, namely first the cooling of the reaction mixture to low temperatures and secondly the recovery of the whole of the acetylene formed in the electric arc, are achieved by carrying out the cooling of the gas mixture leaving the electric arc in two stages in such a manner that the gas mixture is first cooled to a temperature of between about 300° and 100° C., for example by means of a moderately warm cooling element, arranged directly behind the reaction zone, on which the carbon black contained in the mixture is precipitated, and the gas mixture containing acetylene and free from or poor in carbon black is then completely cooled to atmospheric temperature by a second cooling element having a temperature lower than the first.

As the cooling means for the first stage, namely, for precipitating the carbon black, may be mentioned, for example, an arrangement of narrow pipes through which water flows under pressure. Cheap superheated steam is thus produced simultaneously, thereby increasing the economy of the process. By increasing the amount of water in case of undue rise in temperature it is easy to provide that the temperature of the interior of the pipes does not rise substantially above 300° C. The carbon black soon separates on the pipes and may be removed periodically or continuously by knocking, shaking, scraping and the like in so far as the carbon black does not fall off spontaneously in loose lumps. The cooling elements may be also arranged so that they are continually moved from the place, behind the reaction zone, at which the carbon black is deposited to a place which lies outside the hot gas current where the carbon black may likewise be removed by knocking or by special brushes or scrapers. The carbon black obtained is grey with a tinge of brown or yellow; it contains a few per cent by weight of constituents soluble in ether. By reason of its property of rendering materials extremely elastic it is very suitable as an addition to other fillers for the preparation of rubber from natural or artificial initial materials.

In all cases provision must be made that the reaction gases are at once cooled to a temperature at which undesirable by-reactions, such as the formation of carbon black from the acetylene or the production of ethylene by hydrogenation of the acetylene, or diacetylene formation are precluded. The maximum temperature permissible varies with the constructional material employed for the cooling elements. Thus with iron or aluminium a temperature of 300° C. should not be exceeded. If brass were employed the temperature would have to be kept below 200° C. This metal is therefore not very suitable for the purpose in question.

According to this invention it is possible to separate the carbon black from the very hot gases directly behind the electric arc so that the side reactions of the acetylene which take place at temperatures of 1000° C. or less, especially under the influence of solid materials, in particular carbon black, contained in the reaction mixture are avoided almost entirely. The further cooling of the acetylene largely freed from carbon black may be carried out without inconvenience because the catalytic influence of the carbon black is no longer exerted. In case the gases still contain carbon black it is advantageous for this purpose to employ a cooled large hollow space into which the gases may be introduced in a whirling motion, such as is described in our copending application Ser. No. 563,784, filed Sept. 19, 1931.

The following example will further illustrate the nature of this invention but the invention is not restricted to this example.

Example

A gas mixture consisting of 50.4 per cent of hydrogen, 44.7 per cent of methane, 4 per cent of nitrogen and 0.9 per cent of unsaturated hydrocarbon, oxides of carbon and oxygen is led through an electric arc of about 100 kilowatts power of the type of the uusal Schönherr furnace.

Directly above the water cooled end of the electric arc there is situated transversely to the direction of flow of the gases a system of superimposed narrow cooled pipes on which the greater part of the carbon black is deposited. The gas practically free from carbon and at a temperature of about 250° C. is then cooled to room temperature in a hollow space cooler. Between the first and second cooling stages is arranged a separator in which the carbon black displaced by the scraping of the cooling elements from time to time is collected. The yield of acetylene is from about 66 to 68 liters per kilowatt hour. The yield of carbon black is about 8 grams per kilowatt hour.

The method of working according to the present invention will be further described with reference to the accompanying drawing of which Figure 1 shows a vertical section through an apparatus suitable for carrying out the process according to the invention. Figure 2 represents a vertical section of a somewhat modified form of apparatus. The same numerals refer to corresponding devices.

Referring to Figure 1 in detail numeral 1 represents the electric arc space the walls of which are cooled by water supplied at 11 and withdrawn at 12. The gases issuing from the arc space are then led in vessel 14 over tubes 2 through which water flows under pressure. The carbon black depositing on the tubes 2 may be scraped off therefrom by devices 3, is collected in tube 4 connecting with the bottom of vessel 14 and removed by conveyer wheel 13. The gases cooled by tubes 2 to a medium temperature are passed to a second cooling device 5 in which they are brought to an atmospheric temperature.

In the apparatus shown in Figure 2 part of the internally cooled cooling devices 7 are mounted on a rotatable shaft 8 and part of the cooling devices 9 is rigidly mounted in the vessel 15 so that the devices 9 may be cleaned from carbon black deposited thereon by brushes 6 mounted on the devices 7 and vice versa. The carbon black falling down to the bottom of the vessel 15 may be conveyed by a conveyer worm 16 into the tube 4 and removed by conveyer wheel 13. The gases cooled in vessel 15 to a medium temperature are cooled to atmospheric temperature in cooling vessel 5.

What we claim is:

1. In the conversion of a vaporized hydrocarbon into acetylene and carbon black by the action of an electric arc, the step which comprises cooling the mixture of gas and carbon black issuing from the arc first to a temperature between 100° and 300° C. by heat exchange with a cooling element, carbon black being thereby deposited on this element, and then further cooling the gas freed from at least part of the carbon black to atmospheric temperature by contacting it with a second cooling element.

2. In the conversion of a gas comprising methane into acetylene and carbon black by the action of an electric arc, the step which comprises cooling the mixture of gas and carbon black issuing from the arc first to a temperature between 100° and 300° C. by heat exchange with a cooling element, carbon black being thereby deposited on this element, and then further cooling the gas freed from at least part of the carbon black to atmospheric temperature by contacting it with a second cooling element.

3. In the conversion of a gas comprising methane into acetylene and carbon black by the action of an electric arc, the step which comprises cooling the mixture of gas and carbon black issuing from the arc first to a temperature between 100° and 300° C. by heat exchange with a surface cooled with compressed water, carbon black being thereby deposited on this surface, and then further cooling the gas freed from at least part of the carbon black to atmospheric temperature by contacting it with a second cooling surface.

OTTO EISENHUT.
HEINRICH SCHILLING.
PAUL BAUMANN.